(12) United States Patent
Li et al.

(10) Patent No.: US 10,261,609 B2
(45) Date of Patent: Apr. 16, 2019

(54) ACTIVE STYLUS, BOOST CIRCUIT, AND CONTROL METHOD THEREFOR

(71) Applicant: SHENZHEN GOODIX TECHNOLOGY CO., LTD., Shenzhen, Guangdong (CN)

(72) Inventors: Mengping Li, Guangdong (CN); Canhong Du, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 30 days.

(21) Appl. No.: 15/817,514

(22) Filed: Nov. 20, 2017

(65) Prior Publication Data

US 2018/0292920 A1  Oct. 11, 2018

Related U.S. Application Data

(63) Continuation of application No. PCT/CN2017/079799, filed on Apr. 7, 2017.

(51) Int. Cl.
*G06F 3/02* (2006.01)
*G06F 3/038* (2013.01)
*G06F 3/0354* (2013.01)

(52) U.S. Cl.
CPC ........ *G06F 3/0383* (2013.01); *G06F 3/03545* (2013.01)

(58) Field of Classification Search
CPC . G09G 3/36; G09G 5/00; G11C 19/00; G02F 1/1345; G06F 3/038; G06F 3/00; G06F 3/01; G06F 3/03; G06F 3/045
See application file for complete search history.

(56) References Cited

U.S. PATENT DOCUMENTS

2011/0115777 A1*  5/2011  Park ................ H02M 3/158
                                                345/212
2011/0320156 A1  12/2011  Oohashi et al.
(Continued)

FOREIGN PATENT DOCUMENTS

CN    101232239 A    7/2008
CN    102478974 A    5/2012
(Continued)

OTHER PUBLICATIONS

Extended European Search Report for European Patent Application No. 17797041 dated May 30, 2018.

*Primary Examiner* — Pegeman Karimi
(74) *Attorney, Agent, or Firm* — Heslin Rothenberg Farley & Mesiti P.C.

(57) ABSTRACT

A boost circuit includes: an inductor, a switch module, a capacitor and a control module. The switch module includes at least a first switch and a second switch. The capacitor and the second switch are connected in parallel. A first terminal of the first switch is connected to one terminal of the inductor. A second terminal of the first switch is connected to a first terminal of the second switch. A second terminal of the second switch is grounded. The other terminal of the inductor is configured to connect a power supply. The control module is connected to a control terminal of the switch module. The control module is configured to control states of the switches in the switch module, to enable the first terminal of the second switch to output a voltage signal with a preset frequency and amplitude.

18 Claims, 12 Drawing Sheets

(56) References Cited

U.S. PATENT DOCUMENTS

| | | | |
|---|---|---|---|
| 2011/0320165 | A1 | 12/2011 | Miyamoto et al. |
| 2015/0256069 | A1* | 9/2015 | Athalye ................ H02M 3/158 |
| | | | 315/297 |
| 2017/0005646 | A1* | 1/2017 | Hargreaves .............. H03K 5/02 |
| 2017/0040897 | A1* | 2/2017 | Zhang ................ H02M 3/1582 |

FOREIGN PATENT DOCUMENTS

| | | |
|---|---|---|
| CN | 202711183 U | 1/2013 |
| CN | 103425296 A | 12/2013 |
| CN | 104216538 A | 12/2014 |
| CN | 204423321 U | 6/2015 |
| CN | 104883078 A | 9/2015 |

\* cited by examiner

ACTIVE STYLUS, BOOST CIRCUIT, AND CONTROL METHOD THEREFOR

CROSS-REFERENCE TO RELATED APPLICATION

This application is a continuation of International Patent Application No. PCT/CN2017/079799, with an international filing date of Apr. 7, 2017, which is hereby incorporated by reference herein, in its entirety.

TECHNICAL FIELD

The present disclosure relates to boost circuits, and more particularly, to an active stylus, a boost circuit and a control method for the boost circuit.

BACKGROUND

Currently, more and more terminal devices have a touchscreen. An active stylus 101 may be used to write or input an instruction to a terminal device 104 having a touchscreen, such as a computer with a screen, a mobile terminal device, a graphic tablet and the like, so as to implement human-computer interaction, as shown in FIG. 1.

The active stylus 101 outputs an encoded signal via a stylus tip 103 at an end of a stylus head 102, so as to implement communication between the active stylus 101 and the terminal device 104 having the touchscreen. The encoded signal output by the stylus tip 103 is usually a high-voltage signal, so as to increase a signal-to-noise ratio of a communication signal between the active stylus 101 and the terminal device 104 having the touchscreen.

During implementing the present disclosure, it is found that the existing technologies at least have the following problems: a current solution of implementing high-voltage encoding by the stylus tip 103 is mainly an LC resonance encoding. In an LC resonance circuit, an inductor and a capacitor form a series resonance circuit. A power source in the active stylus 101 provides an energy input to the LC resonance circuit. The LC resonance circuit outputs a high-voltage encoded signal to the stylus tip 103. However, in the LC resonance circuit, once the inductor and the capacitor are chosen, a frequency of an output high voltage of the circuit is fixed and non-adjustable, resulting in that a signal-to-noise ratio of the LC resonance circuit is fixed and cannot be increased. Moreover, an amplitude of the output high voltage of the LC resonance circuit is also fixed and non-adjustable, resulting in that system power consumption cannot be reduced.

SUMMARY

According to some embodiments of the present disclosure, there are provided an active stylus, a boost circuit and a control method for the boost circuit. By controlling a switch module, a frequency of an output high voltage of the boost circuit is adjustable, so that a signal-to-noise ratio of a communication signal can be increased by using a frequency-hopping communication technology; moreover, an amplitude of the output high voltage of the boost circuit is adjustable, so that system power consumption can be reduced by adjusting an amplitude of an encoded voltage according to an application scenario.

According to an embodiment of the present disclosure, there is provided a boost circuit, including: an inductor, a switch module, a capacitor and a control module. The switch module includes at least a first switch and a second switch, the capacitor and the second switch are connected in parallel. A first terminal of the first switch is connected to one terminal of the inductor, a second terminal of the first switch is connected to a first terminal of the second switch, and a second terminal of the second switch is grounded. The other terminal of the inductor is configured to connect a power supply. The control module is connected to a control terminal of the switch module. The control module is configured to control states of the switches in the switch module, to enable the first terminal of the second switch to output a voltage signal with a preset frequency and amplitude.

According to an embodiment of the present disclosure, there is provided an active stylus, including: a stylus body, a stylus tip, a power supply and the above boost circuit. The stylus tip is disposed at an end of the stylus body. The power supply and the boost circuit are both disposed inside the stylus body. The other terminal of the inductor is connected to the power supply, and the first terminal of the second switch is connected to the stylus tip.

According to an embodiment of the present disclosure, there is further provided a control method for a boost circuit. The boost circuit includes an inductor, a switch module, a capacitor and a control module. The switch module includes at least a first switch and a second switch, the capacitor and the second switch are connected in parallel. A first terminal of the first switch is connected to one terminal of the inductor, a second terminal of the first switch is connected to a first terminal of the second switch, and a second terminal of the second switch is grounded. The other terminal of the inductor is configured to connect a power supply. The control method includes steps of: a first stage of controlling the first switch and the second switch to be both in a closed state, to enable the first terminal of the second switch to output a low-level voltage signal; a second stage of controlling the first switch to be in a closed state and the second switch to be in an open state, to enable the inductor and the capacitor to generate LC resonance and enable a voltage signal output by the first terminal of the second switch to change as a voltage signal of the first terminal of the first switch changes; and a third stage of controlling the first switch and the second switch to be both in an open state, to enable the voltage signal of the first terminal of the first switch to be clamped and the first terminal of the second switch to output a voltage signal with a preset frequency and amplitude; the first stage, the second stage and the third stage are sequentially performed.

According to an embodiment of the present disclosure, there is further provided a control method for a boost circuit. The boost circuit includes an inductor, a switch module, a capacitor and a control module. The switch module includes at least a first switch, a second switch and a third switch, the capacitor and the second switch are connected in parallel. A first terminal of the first switch is connected to one terminal of the inductor, a second terminal of the first switch is connected to a first terminal of the second switch, and a second terminal of the second switch is grounded. The other terminal of the inductor is configured to connect a power supply. A first terminal of the third switch is connected to the first terminal of the first switch, and a second terminal of the third switch is grounded. The control method includes steps of: a first stage of controlling the second switch and the third switch to be in a closed state, to enable the first terminal of the second switch to output a low-level voltage signal, the first switch is in an open state or a closed state; a second stage of controlling the second switch and the third switch to be both in an open state and controlling the first switch to be in a closed state, to enable the inductor and the capacitor to generate LC resonance and enable a voltage signal output by the first terminal of the second switch to change as a voltage signal of the first terminal of the first switch changes; and a third stage of controlling the first switch, the second switch and the third switch to be all in an open state, to enable a voltage of the first terminal of the first switch to be clamped and the first terminal of the second switch to output a voltage signal with a preset frequency and amplitude; the first stage, the second stage and the third stage are sequentially performed.

Compared with the existing technologies, in some embodiments of the present disclosure, by controlling the switch module, a frequency of the output high voltage of the boost circuit is adjustable, so that a signal-to-noise ratio of the communication signal can be increased by using the frequency-hopping communication technology; moreover, an amplitude of the output high voltage of the boost circuit is adjustable, so that system power consumption can be reduced by adjusting an amplitude of the encoded voltage according to an disclosure scenario.

Furthermore, the switch module further includes a third switch. A first terminal of the third switch is connected to the first terminal of the first switch, and a second terminal of the third switch is grounded. In this embodiment, the third switch is configured to reduce circuit power consumption and improve system efficiency.

Furthermore, the switch module further includes a fourth switch, and the fourth switch is connected to the other terminal of the inductor. The other terminal of the inductor is connected to the power supply through the fourth switch. In this embodiment, by controlling a timing of the second switch and the fourth switch, independent adjustments of both the amplitude and the frequency of the output high voltage of the boost circuit are achieved.

Furthermore, the switches in the switch module are field-effect transistors. The control module is connected to a control terminal of each field-effect transistor, so as to control each field-effect transistor. According to this embodiment, there is provided a configuration manner of a switch group.

Furthermore, the first switch in the switch module is a diode, and the other switch/switches in the switch module is/are a field-effect transistor(s). The control module is connected to a control terminal of each field-effect transistor, so as to control each field-effect transistor. According to this embodiment, there is further provided another configuration manner of a switch group. The diode serves as the first switch, and the diode allows an electric current to pass in a forward direction while a blocking current in a reverse direction, so that there is no need to send a drive signal to perform control.

Furthermore, the control module includes a drive circuit configured to drive the switch module and a control circuit configured to control a driving manner of the drive circuit. According to this embodiment, there is provided a configuration manner of the control module.

Furthermore, the drive circuit and the control circuit are integrated in one chip.

Furthermore, in the control method for the boost circuit, the switch module further includes a fourth switch, and the fourth switch is connected to the other terminal of the inductor. The other terminal of the inductor is connected to the power supply through the fourth switch. Before the first stage, the control method further includes an initial stage of controlling the second switch to be in a closed state and controlling the fourth switch to be in an open state, to enable the first terminal of the second switch to output a low-level voltage signal; the first switch is in an open state or a closed state. The control method further controls the fourth switch to be in a closed state in the first stage. The control method further controls the fourth switch to be in a closed state in the second stage. The control method further controls the fourth switch to be in a closed state in the third stage. According to this embodiment, there is provided a switch control method in which the fourth switch is included.

Furthermore, in the control method for the boost circuit, the switch module further includes a fourth switch, and the fourth switch is connected to the other terminal of the inductor. The other terminal of the inductor is connected to a power supply voltage through the fourth switch. Before the first stage, the control method further includes an initial stage of controlling the fourth switch to be in an open state and controlling the second switch and the third switch to be in a closed state, to enable the first terminal of the second switch to output a low-level voltage signal; the first switch is in an open state or a closed state. The control method further controls the fourth switch to be in a closed state in the first stage. The control method further controls the fourth switch to be in a closed state in the second stage. The control method further controls the fourth switch to be in a closed state in the third stage. According to this embodiment, there is provided a switch control method in which the fourth switch is included.

BRIEF DESCRIPTION OF THE DRAWINGS

One or more embodiments are exemplarily described by using the accompanying drawings corresponding thereto. These exemplary descriptions do not constitute limitations to the embodiments. The elements having a same reference numeral in the accompanying drawings represent similar elements. Unless particularly stated, the figures in the accompanying drawings do not constitute limitations in proportion.

DETAILED DESCRIPTION

To make the objectives, technical solutions and advantages of the present disclosure clearer and more comprehensible, some embodiments of the present disclosure are further described below in detail with reference to the accompanying drawings and embodiments. It should be understood that the specific embodiments described herein are merely used to describe the present application, and are not used to limit the present application.

Figure 1:
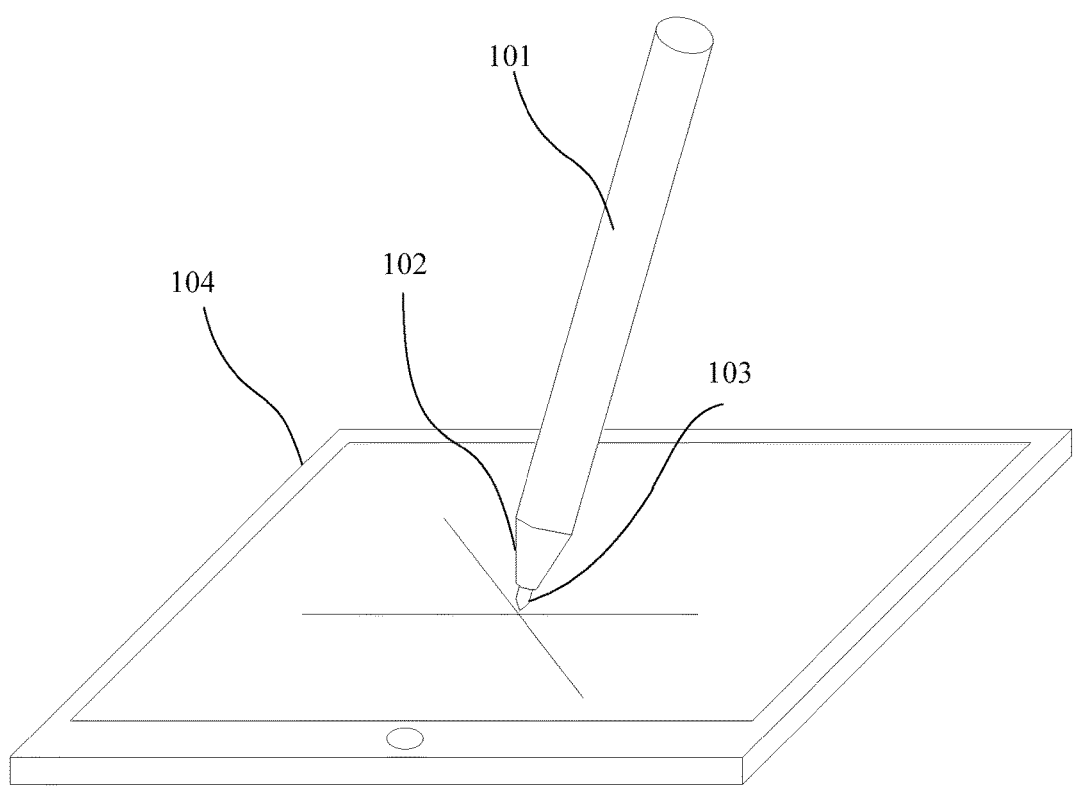
FIG. 1 is a schematic diagram of controlling a terminal device with an active stylus according to the existing technologies.
Figure 2:
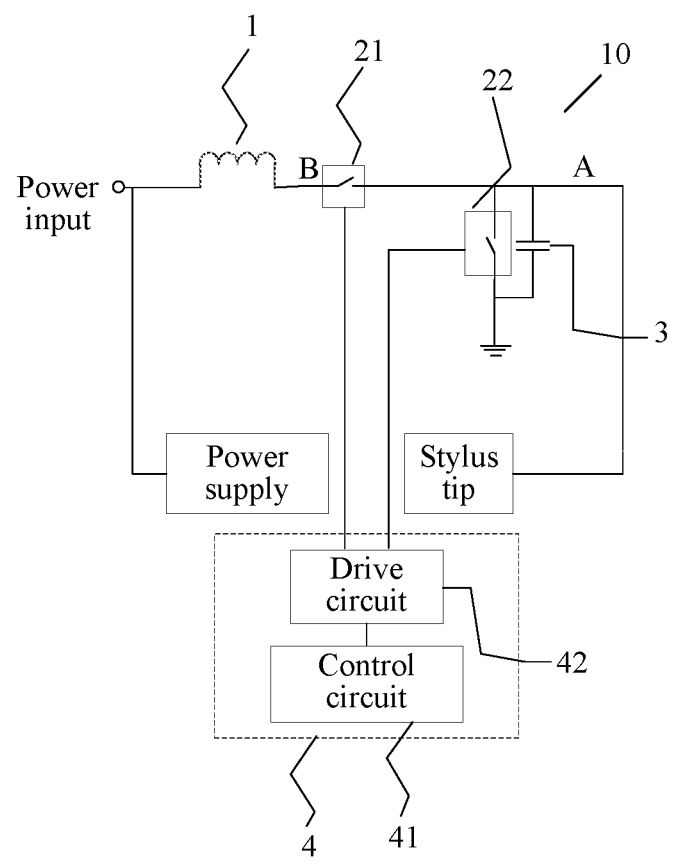
FIG. 2 is a schematic diagram of a boost circuit according to a first embodiment of the present disclosure.

A first embodiment of the present disclosure relates to a boost circuit. The boost circuit is applied to an active stylus, so that when a power supply of the active stylus provides an energy input, the boost circuit outputs a high-voltage encoded signal to a stylus tip of the active stylus. Referring to FIG. 2, the boost circuit 10 includes an inductor 1, a switch module, a capacitor 3 and a control module 4.

The switch module includes at least a first switch 21 and a second switch 22. The capacitor 3 and the second switch 22 are connected in parallel. A first terminal of the first switch 21 is connected to one terminal of the inductor 1, a second terminal of the first switch 21 is connected to a first terminal of the second switch 22, and a second terminal of the second switch 22 is grounded. The other terminal of the inductor 1 is configured to connect the power supply and receives a power supply voltage.

The control module 4 is connected to a control terminal of the switch module. The control module 4 is configured to control states of the switches in the switch module, to enable the first terminal of the second switch 22 to output a voltage signal with a preset frequency and amplitude. It should be noted that, referring to FIG. 2, the voltage signal with a preset frequency and amplitude that is output by the first terminal of the second switch 22 is a voltage signal output at a point A in FIG. 2. The point A is connected to the stylus tip of the active stylus.

In this embodiment, the control module 4 includes a control circuit 41 and a drive circuit 42. The drive circuit 42 is connected to a control terminal of the switch module, and is configured to drive the switch module. The control circuit 41 is connected to the drive circuit 42, and is configured to control a driving manner of the drive circuit 42, to enable the drive circuit 42 to generate a square wave having a particular duty cycle to control the switch module.

In an example, the drive circuit 42 and the control circuit 41 may be integrated in one chip, and a square wave is directly output via an IO port of the chip. However, the present disclosure is not limited thereto. Alternatively, the control circuit 41 and the drive circuit 42 may be disposed separately, and the drive circuit 42 outputs a square wave.

In this embodiment, the switches in the switch module may be field-effect transistors, that is, the first switch 21 and the second switch 22 are both field-effect transistors. Because a field-effect transistor has a parasitic capacitance, the capacitor 3 may be a parasitic capacitance of the second switch 22 (field-effect transistor) (in this embodiment, the field-effect transistor is used as an example). Alternatively, the boost circuit 10 may be provided with a physical capacitor connected in parallel to the second switch 22. In this case, the capacitor 3 has a total capacitance of the physical capacitor and the parasitic capacitance of the second switch 22 (field-effect transistor) connected in parallel to the physical capacitor.

The control module 4 is connected to a control terminal of each field-effect transistor, so as to control each field-effect transistor. That is, the drive circuit 42 of the control module 4 is connected to control terminals of the first switch 21 (field-effect transistor) and the second switch 22 (field-effect transistor) respectively, to send drive signals to control the first switch 21 and the second switch 22 respectively.

Figure 3:
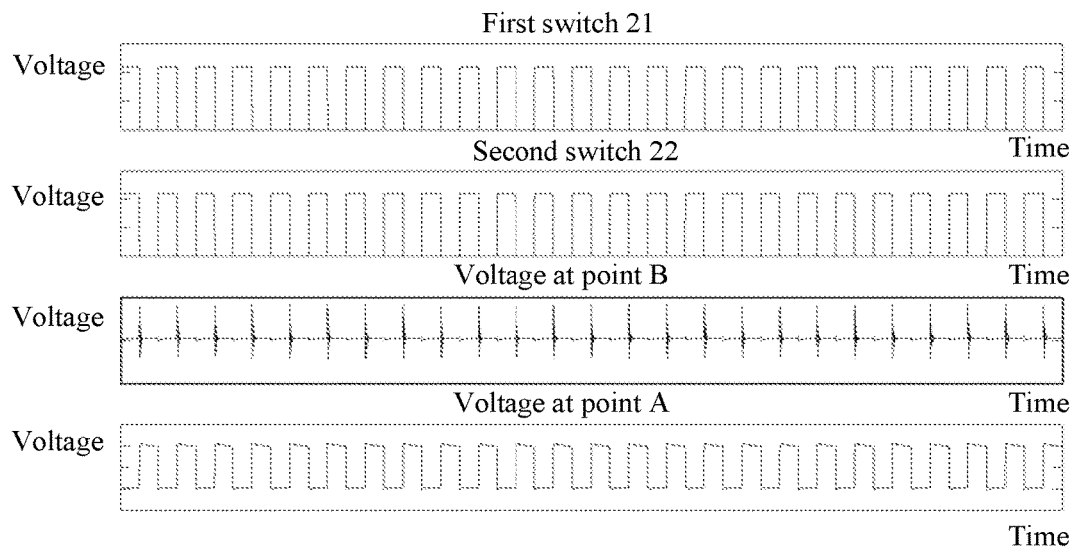
FIG. 3 is a waveform diagram when the boost circuit works normally according to the first embodiment of the present disclosure.
Figure 4:
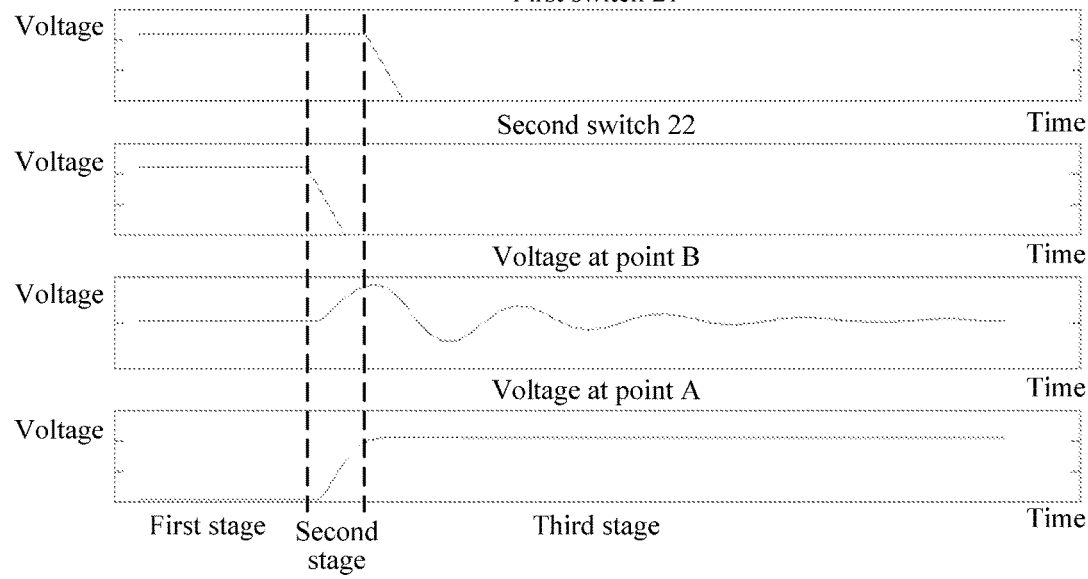
FIG. 4 is a waveform diagram within one period when the boost circuit works normally according to the first embodiment of the present disclosure.

In this embodiment, FIG. 3 is a waveform diagram when the boost circuit works normally. FIG. 4 is an enlarged waveform diagram within one period when the boost circuit works normally.

Hereinafter, a working principle of the boost circuit during normal working is described by taking one period as an example. Referring to FIG. 4, the table below shows states of switches of different stages within one period. A first stage, a second stage and a third stage are sequentially performed.

| Stage | Switch | |
| --- | --- | --- |
| | First switch | Second switch |
| First stage | Closed | Closed |
| Second stage | Closed | Open |
| Third stage | Open | Open |

In the first stage, the control circuit 41 controls the drive circuit 42 to send a drive signal and controls the first switch 21 and the second switch 22 to be both turned on, i.e., controls the first switch 21 and the second switch 22 to be both in a closed state. The point A and a point B are both grounded. In this case, the power supply charges the inductor 1, and a low-level voltage signal is output at the point A.

In the second stage, the control circuit 41 controls the drive circuit 42 to send a drive signal and controls the second switch 22 to open, i.e., controls the first switch 21 to be in a closed state and the second switch 22 to be in an open state. In this case, the inductor 1 and the capacitor 3 form an LC resonance circuit. An output voltage at the point A and a voltage at the point B are consistent and oscillate with LC resonance.

In the third stage, the control circuit 41 controls the drive circuit 42 to send a drive signal and controls the first switch 21 to open, i.e., controls the first switch 21 and the second switch 22 to be both in an open state. Generally, the first switch 21 is open at a quarter of an LC resonance period. In this case, a rising voltage of the LC resonance circuit reaches a maximum value. Due to the capacitor 3, the voltage at the point A may maintain a value of a voltage when the first switch 21 is open.

For the boost circuit in this embodiment, without a magnetic saturation phenomenon in the inductor 1, a maximum value of a charging current of the inductor 1 depends on a conduction time of the second switch 22. The conduction time of the second switch 22 is duration from the first stage to the second stage. The maximum value of the rising voltage of the LC resonance circuit depends on the maximum value of the charging current of the inductor 1, and a final amplitude of a high voltage output at the point A depends on a time point when the first switch 21 is opened. When the second switch 22 is turned on, a low-level voltage signal is output at the point A. When the second switch 22 is open, a high voltage is output at the point A. The frequency of the high voltage output at the point A depends on a switching frequency of the second switch 22. Therefore, by controlling the switching timing of the first switch 21 and the second switch 22, adjustments of both the amplitude and the frequency of the high voltage output at the point A are achieved simultaneously, so that a voltage signal with a preset frequency and amplitude can be output at the point A.

Compared with the existing technologies, in this embodiment, by controlling the switch module, the frequency of the output high voltage of the boost circuit is adjustable, resulting in that a signal-to-noise ratio of a communication signal can be increased by using the frequency-hopping communication technology, and further the amplitude of the output high voltage of the boost circuit is adjustable, resulting in that system power consumption can be reduced by adjusting an amplitude of an encoded voltage according to an application scenario.

A second embodiment of the present disclosure relates to a boost circuit. This embodiment is substantially the same as the first embodiment. A major difference lies in that, the first switch 21 is a field-effect transistor in the first embodiment, while the first switch 21 is a diode in this embodiment, referring to FIG. 5.

In this embodiment, the first switch 21 in the switch module is a diode, and the other switch is a field-effect transistor. The control module 4 is connected to a control terminal of the field-effect transistor, so as to control the field-effect transistor. That is, the drive circuit 42 of the control module 4 is connected to the control terminal of the second switch 22 (field-effect transistor), so as to send a drive signal to control the second switch 22.

In this embodiment, referring to FIG. 4, the working principle of the boost circuit is as follows (the table below shows states of the switches in each stage):

|  | Switch | |
| --- | --- | --- |
| Stage | First switch (diode) | Second switch |
| First stage | Closed | Closed |
| Second stage | Closed | Open |
| Third stage | Open | Open |

In the first stage, the control circuit 41 controls the drive circuit 42 to send a drive signal and controls the second switch 22 to be turned on, i.e., controls the second switch 22 to be in a closed state. The point A is grounded, and the voltage at the point B is slightly greater than the voltage at the point A. In this case, the first switch 21 (diode) is turned on, the power supply charges the inductor 1, and a low-level voltage signal is output at the point A.

In the second stage, the control circuit 41 controls the drive circuit 42 to send a drive signal and controls the second switch 22 to open, i.e., controls the second switch 22 to be in an open state. The inductor 1 and the capacitor 3 form an LC resonance circuit when the second switch 22 is open. The voltage at the point B is in a rising state within a first quarter of the LC resonance period. The voltage at the point B is greater than the voltage at the point A. The first switch 21 (diode) is in a turned-on state. The voltage output at the point A rises as the voltage at the point B rises.

In the third stage, after the quarter of the LC resonance period, the voltage at the point B is in a falling state. The voltage at the point B is less than the voltage at the point A. The first switch 21 (diode) is in reverse cut-off and is in a turned-off state. The voltage output at the point A is clamped at a value of the voltage at the point B when the first switch 21 (diode) is turned off. When the voltage at the point B starts to fall from a maximum value of the rising voltage of the LC resonance circuit, the diode is in reverse cut-off. However, due to junction capacitance, a certain time is still needed before the diode is completely turned off. Therefore, during the time for the diode to be completely turned off, a resonant voltage at the point B falls. The voltage output at the point A varies as the voltage at the point B varies, so that the high voltage output at the point A is clamped to be slightly less than the maximum value of the rising voltage of the LC resonance circuit. That is, the output high voltage of the boost circuit is clamped to be slightly less than the maximum value of the rising voltage of the LC resonance circuit.

Compared with the first embodiment, in this embodiment, the diode serves as the first switch, and the diode allows an electric current to pass in a forward direction while a blocking current in a reverse direction, so that there is no need to send a drive signal to perform control.

A third embodiment of the present disclosure relates to a boost circuit, this embodiment is an improvement based on the second embodiment. A major improvement lies in that: in this embodiment, referring to FIG. 6, the switch module further includes a third switch 23.

In this embodiment, a first terminal of the third switch 23 is connected to the first terminal of the first switch 21, and a second terminal of the third switch 23 is grounded.

In this embodiment, referring to FIG. 4, the working principle of the boost circuit is as follows (the table below shows states of switches in each stage):

|  | Switch | | |
| --- | --- | --- | --- |
| Stage | First switch (diode) | Second switch | Third switch |
| First stage | Open | Closed | Closed |
| Second stage | Closed | Open | Open |
| Third stage | Open | Open | Open |

In the first stage, the control circuit 41 controls the drive circuit 42 to send a drive signal and controls the second switch 22 and the third switch 23 to be both turned on, i.e., controls the second switch 22 and the third switch 23 to be both in a closed state. The point A and the point B are both grounded. The first switch 21 (diode) is turned off. A low-level voltage signal is output at the point A.

In the second stage, the control circuit 41 controls the drive circuit 42 to send a drive signal and controls both the second switch 22 and the third switch 23 to open, i.e., controls the second switch 22 and the third switch 23 to be both in an open state. The inductor 1, the capacitor 3 when the second switch 22 is open, and the capacitor 3 when the third switch 23 is open form an LC resonance circuit. The voltage at the point B is in a rising state within a first quarter of the LC resonance period. The voltage at the point B is greater than the voltage at the point A. In this case, the first switch 21 (diode) is in a turned-on state. The voltage output at the point A rises as the voltage at the point B rises.

In the third stage, after the quarter of the LC resonance period, the voltage at the point B is in a falling state. The voltage at the point B is less than the voltage at the point A. The first switch 21 (diode) is in reverse cut-off and is in a turned-off state. The voltage output at the point A is clamped at a value of the voltage at the point B when the first switch 21 (diode) is turned off.

Compared with the second embodiment, in this embodiment, with the third switch, in the first stage, both the second switch and the third switch are turned on, the point A and the point B are both grounded, and the first switch (diode) is in a turned-off state, so that circuit power consumption is reduced and system efficiency is improved. It is worth mentioning that this embodiment may also serve as an improvement based on the first embodiment, and a same technical effect can be achieved.

A fourth embodiment of the present disclosure relates to a boost circuit, and this embodiment is an improvement based on the second embodiment. A major improvement lies in that: in this embodiment, referring to FIG. 7, the switch module further includes a fourth switch 24.

In this embodiment, the other terminal of the inductor 1 is connected to the power supply through the fourth switch 24, and receives a power supply voltage.

The working principle of the boost circuit in this embodiment is as follows (the table below shows states of switches in each stage):

|  | Switch | | |
| --- | --- | --- | --- |
| Stage | First switch (diode) | Second switch | Fourth switch |
| Initial stage | Open | Closed | Open |
| First stage | Closed | Closed | Closed |
| Second stage | Closed | Open | Closed |
| Third stage | Open | Open | Closed |

In the initial stage, the control circuit 41 controls the drive circuit 42 to send a drive signal and controls the second switch 22 to be turned on and the fourth switch 24 to be turned off, i.e., controls the second switch 22 to be in a closed state and the fourth switch 24 to be in an open state. The power supply is disconnected from the inductor 1. No energy is input to the circuit. The point A is grounded. The point B generates a negative voltage due to Lenz's law. The first switch 21 (diode) is in reverse cut-off and is in a turned-off state. A low-level voltage signal is output at the point A.

In the first stage, the control circuit 41 controls the drive circuit 42 to send a drive signal and controls the fourth switch 24 to be turned on, i.e., controls the second switch 22 and the fourth switch 24 to be both in a closed state. The power supply charges the inductor 1. The point A is grounded. The voltage at the point B is greater than the voltage at the point A. The first switch 21 (diode) is in a turned-on state. A low-level voltage signal is output at the point A.

In the second stage, the control circuit 41 controls the drive circuit 42 to send a drive signal and controls the second switch 22 to be turn-off, i.e., controls the second switch 22 to be in an open state and the fourth switch 24 to be in a closed state. The inductor 1 and the capacitor 3 form an LC resonance circuit when the second switch 22 is turned off. The voltage at the point B is in a rising state within a first quarter of the LC resonance period. The voltage at the point B is greater than the voltage at the point A. The first switch 21 (diode) is in a turned-on state. The voltage output at the point A rises as the voltage at the point B rises.

In the third stage, after the quarter of the LC resonance period, the voltage at the point B is in a falling state. The voltage at the point B is less than the voltage at the point A. The first switch 21 (diode) is in reverse cut-off and is in a turned-off state. The voltage output at the point A is clamped at a value of the voltage at the point B when the first switch 21 (diode) is turned off.

In the second embodiment, the second switch 22 is configured to adjust both the amplitude and the frequency of the output high voltage. The higher the frequency of the output high voltage requires, the quicker the second switch 22 is required to switch, and correspondingly, the amplitude of the voltage output at the point A is smaller (that is, the faster switch of the second switch 22 results in a shorter conduction time for the second switch 22, and a shorter charging time for the inductor). However, in this embodiment, the fourth switch 24 is further provided. When the fourth switch 24 is turned off, the power supply is disconnected from the inductor 1, and no energy is input to the circuit. When the fourth switch 24 is turned on, the power supply is connected to the inductor 1 to provide energy input to the circuit, so as to charge the inductor. With the fourth switch 24, by adjusting a charging time for the inductor, a maximum value of the charging current of the inductor 1 is controlled, and thus a maximum value of the rising voltage of the LC resonance circuit is controlled, thereby adjusting an amplitude of the high voltage output at the point A. That is, the amplitude of the high voltage output at the point A is adjusted by controlling the fourth switch 24.

Figure 8:
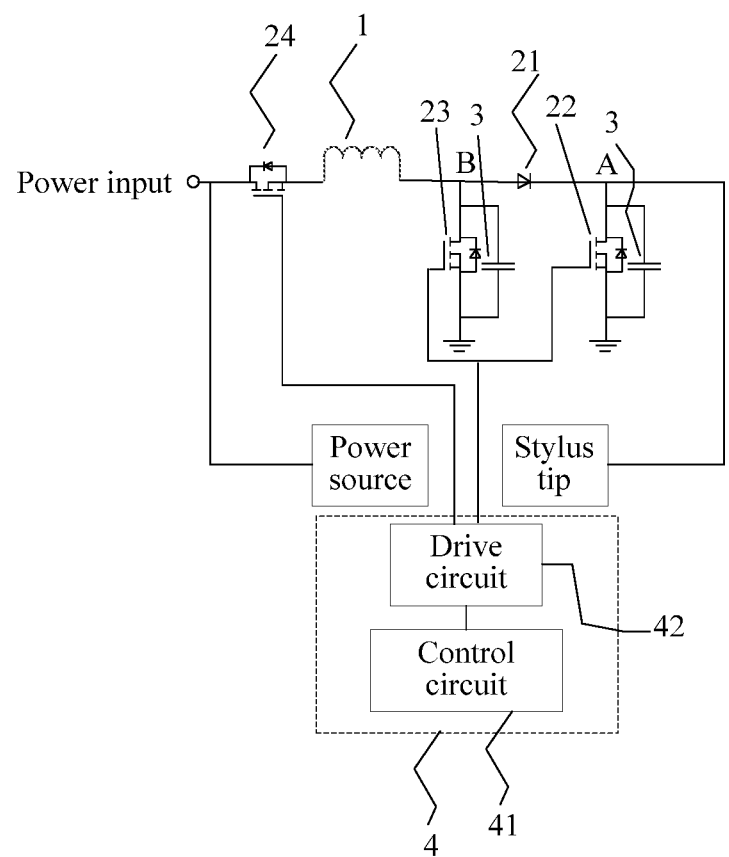
FIG. 8 is a schematic diagram of a boost circuit including a fourth switch according to the fourth embodiment of the present disclosure.

In addition, referring to FIG. 8, this embodiment may also serve as an improvement based on the third embodiment.

In this embodiment, the fourth switch 24 is connected to the other terminal of the inductor 1. The inductor 1 receives a power supply voltage through the fourth switch 24.

The working principle of the boost circuit in this embodiment is as follows (the table below shows states of switches in each stage):

|  | Switch | | | |
| --- | --- | --- | --- | --- |
| Stage | First switch (diode) | Second switch | Third switch | Fourth switch |
| Initial stage | Open | Closed | Closed | Open |
| First stage | Open | Closed | Closed | Closed |
| Second stage | Closed | Open | Open | Closed |
| Third stage | Open | Open | Open | Closed |

In the initial stage, the control circuit 41 controls the drive circuit 42 to send a drive signal and controls the second switch 22 and the third switch 23 to be both turned on and the fourth switch 24 to be turned off, i.e., controls the second switch 22 and the third switch 23 to be both in a closed state and the fourth switch 24 to be in an open state. The power supply is disconnected from the inductor 1. No energy is input to the circuit. The point A and the point B are both grounded. The first switch 21 (diode) is in a turned-off state. A low-level voltage signal is output at the point A.

In the first stage, the control circuit 41 controls the drive circuit 42 to send a drive signal and controls the fourth switch 24 to be turned on, i.e., controls the second switch 22, the third switch 23 and the fourth switch to be all in a closed state. The power supply charges the inductor 1. The point A and the point B are both grounded. The first switch 21 (diode) is in a turned-off state. A low-level voltage signal is output at the point A.

In the second stage, the control circuit 41 controls the drive circuit 42 to send a drive signal and controls the second switch 22 and the third switch 23 to be both turned off, i.e., controls the second switch 22 and the third switch 23 to be both in an open state and the fourth switch 24 to be in a closed state. The inductor 1, the capacitor 3 when the second switch 22 is turned off, and the capacitor 3 when the third switch 23 is turned off form an LC resonance circuit. The voltage at the point B is in a rising state within a first quarter of the LC resonance. The voltage at the point B is greater than the voltage at the point A. The first switch 21 (diode) is in a turned-on state. The voltage output at the point A rises as the voltage at the point B rises.

In the third stage, after the quarter of the LC resonance period, the voltage at the point B is in a falling state. The voltage at the point B is less than the voltage at the point A. The first switch 21 (diode) is in reverse cut-off and is in a turned-off state. The voltage output at the point A is clamped at a value of the voltage at the point B when the first switch 21 (diode) is turned off.

In this embodiment, when the fourth switch 24 is turned off, the power supply is disconnected from the inductor 1, and no energy is input to the circuit. When the fourth switch 24 is turned on, the power supply is connected to the inductor 1 to provide energy input to the circuit, so as to charge the inductor. With the fourth switch 24, by adjusting a charging time for the inductor, a maximum value of the charging current of the inductor 1 is controlled, and thus a maximum value of the rising voltage of the LC resonance circuit is controlled, thereby adjusting an amplitude of the high voltage output at the point A. That is, the amplitude of the high voltage output at the point A is adjusted by controlling the fourth switch 24.

Compared with the second embodiment, in this embodiment, a frequency of an output high voltage is adjusted by a timing control of the second switch. With a timing control of the fourth switch, an amplitude of the output high voltage is adjusted. That is, in this embodiment, independent controls of the amplitude and the frequency of the output high voltage are achieved, so that the amplitude and the frequency of the output high voltage can be flexibly adjusted as required. It should be noted that, this embodiment may also serve an improvement based on the first embodiment, and a same technical effect can be achieved.

Figure 9:
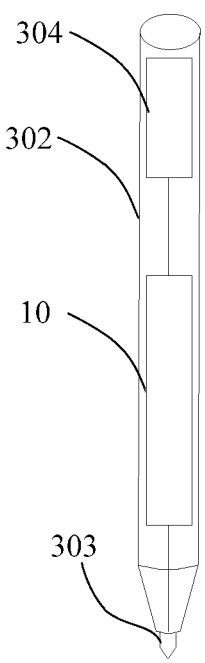
FIG. 9 is a schematic structural diagram of an active stylus according to a fifth embodiment of the present disclosure.

A fifth embodiment of the present disclosure relates to an active stylus, which is applied to write or input an instruction to a terminal device having a touchscreen, such as a computer with a screen, a mobile device, a graphic tablet and the like, so as to implement human-computer interaction. Referring to FIG. 9, the active stylus 301 includes a stylus body 302, a stylus tip 303, a power supply 304 and the boost circuit 10 according to any one of the first embodiment to the fourth embodiment.

In this embodiment, the stylus tip 303 is disposed at an end of the stylus body 302. The power supply 304 and the boost circuit 10 are both disposed inside the stylus body 302. The other terminal of the inductor 1 is connected to the power supply 304, and the first terminal of the second switch 22 is connected to the stylus tip 303. The stylus tip 303 converts a voltage signal with a preset frequency and amplitude into an encoded signal and transmits the encoded signal.

Compared with the existing technologies, in this embodiment, an active stylus applied with a boost circuit is provided.

Figure 5:
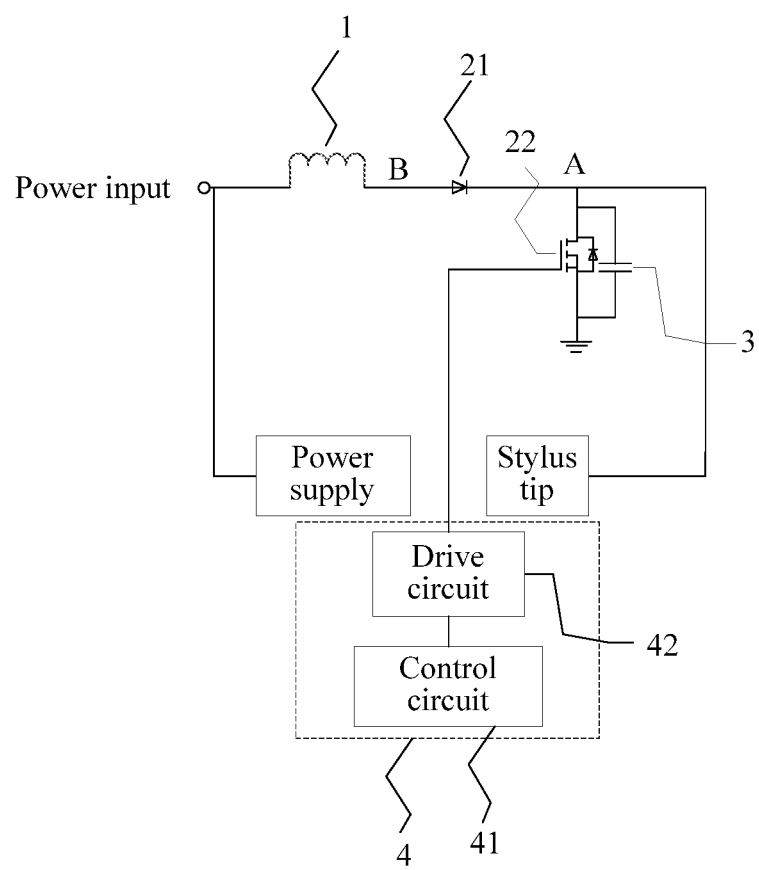
FIG. 5 is a schematic diagram of a boost circuit according to a second embodiment of the present disclosure.

A sixth embodiment of the present disclosure relates to a control method for a boost circuit, which is applied to the above boost circuit 10, referring to FIG. 5.

Figure 10:
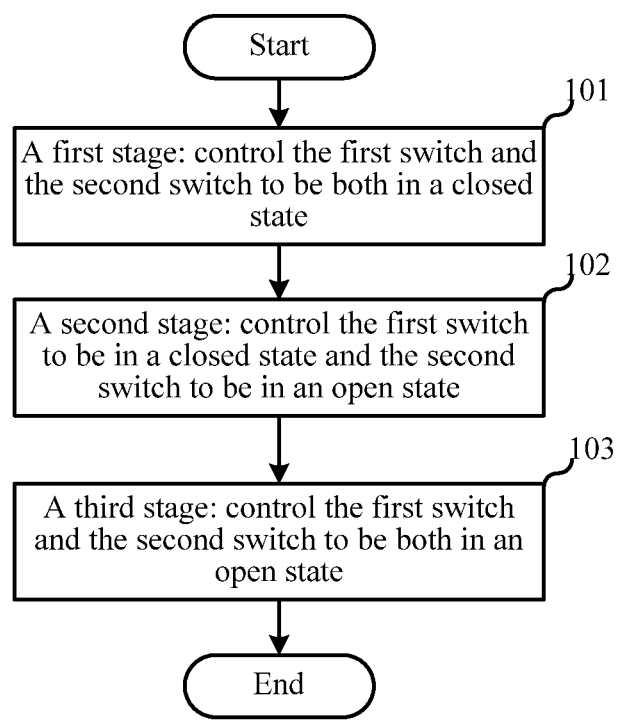
FIG. 10 is a flowchart of a control method for a boost circuit according to a sixth embodiment of the present disclosure.

FIG. 10 is a specific flowchart of the control method for the boost circuit.

Step 101: in a first stage, the first switch and the second switch are controlled to be both in a closed state.

Specifically, the control circuit 41 controls the drive circuit 42 to send a drive signal and controls the second switch 22 to be in a closed state. The point A is grounded. The voltage at the point B is slightly greater than the voltage at the point A. In this case, the first switch 21 (diode) is turned on, and the power supply charges the inductor 1, to enable the first terminal of the second switch 22 to output a low-level voltage signal.

In this embodiment, the first switch 21 is a diode. Because the diode allows an electric current to pass in a forward direction while a blocking current in a reverse direction, a switching state of the diode changes as a switching state of the second switch 22 changes. That is, the control circuit 41 controls switching on or off of the second switch 22, results in that the switching state of the first switch 21 (diode) changes. Therefore, when the first switch 21 is, for example, a component such as a diode (allowing an electric current to pass in a forward direction while a blocking current in a reverse direction), the control of the first switch 21 by the control circuit 41 may be understood as that the control circuit 41 controls the second switch 22 to indirectly control the first switch 21. That is, the control of the first switch 21 by the control circuit 41 is an indirect control. When the first switch 21 is a component having a control terminal, for example, a field-effect transistor, the control of the first switch 21 by the control circuit 41 is a direct control (that is, the control circuit 41 directly sends a signal representing switching on or off to the control terminal of the first switch 21).

Step 102: in a second stage, the first switch is controlled to be in a closed state and the second switch is controlled to be in an open state.

Specifically, the control circuit 41 controls the drive circuit 42 to send a drive signal and controls the second switch 22 to be in an open state. In this case, the inductor 1 and the capacitor 3 form an LC resonance circuit when the second switch 22 is open, and LC resonance occurs. The voltage at the point B is in a rising state within a first quarter of the LC resonance period. The voltage at the point B is greater than the voltage at the point A. The first switch 21 (diode) is in a turned-on state. In this case, the voltage signal output by the first terminal of the second switch 22 rises as a voltage signal from the first terminal of the first switch (that is, the point B) rises.

Step 103: in a third stage, the first switch and the second switch are controlled to be both in an open state.

Specifically, after the quarter of the LC resonance period, the control circuit 41 controls the drive circuit 42 to send a drive signal and controls the second switch 22 to open. The voltage at the point B is in a falling state. The voltage at the point B is less than the voltage at the point A. The first switch 21 (diode) is in reverse cut-off and is in a turned-off state. Due to the capacitor 3, the voltage signal from the first terminal of the first switch 21 (diode) is clamped. The voltage signal output by the first terminal of the second switch 22 maintains a value of a voltage when the first switch 21 (diode) is open. That is, the first terminal of the second switch 22 outputs a voltage signal with a preset frequency and amplitude.

For the boost circuit in this embodiment, without a magnetic saturation phenomenon in the inductor 1, a maximum value of a charging current of the inductor 1 depends on a conduction time of the second switch 22. The conduction time of the second switch 22 is duration from the first stage to the second stage. The maximum value of the rising voltage of the LC resonance circuit depends on the maximum value of the charging current of the inductor 1, and a final amplitude of a high voltage output at the point A depends on a time point when the first switch 21 is opened. When the second switch 22 is turned on, a low-level voltage signal is output at the point A. When the second switch 22 is open, a high voltage is output at the point A. The frequency of the high voltage output at the point A depends on a switching frequency of the second switch 22. Therefore, by controlling the switching timing of the first switch 21 and the second switch 22, simultaneous adjustments of both the amplitude and the frequency of the high voltage output at the point A are achieved, that is, a voltage signal with a preset frequency and amplitude can be output at the point A.

It is apparent that this embodiment is a method embodiment corresponding to the first embodiment and the second embodiment. This embodiment may be implemented in conjunction with the first embodiment and the second embodiment. The related technical details mentioned in the first embodiment and the second embodiment are still effective in this embodiment. To reduce repetition, the technical details are no longer described herein. Correspondingly, the related technical details mentioned in this embodiment are also applicable to the first embodiment and the second embodiment.

Compared with the existing technologies, in this embodiment, by controlling the switch module, a frequency of the output high voltage of the boost circuit is adjustable, so that a signal-to-noise ratio of the communication signal can be increased by using the frequency-hopping communication technology; moreover, an amplitude of the output high voltage of the boost circuit is adjustable, so that system power consumption can be reduced by adjusting an amplitude of the encoded voltage according to an disclosure scenario.

A seventh embodiment of the present disclosure relates to a control method for a boost circuit, and this embodiment is an improvement based on the sixth embodiment. A major improvement lies in that: the control method further includes a control of the fourth switch when a fourth switch is included in the switch module.

Figure 7:
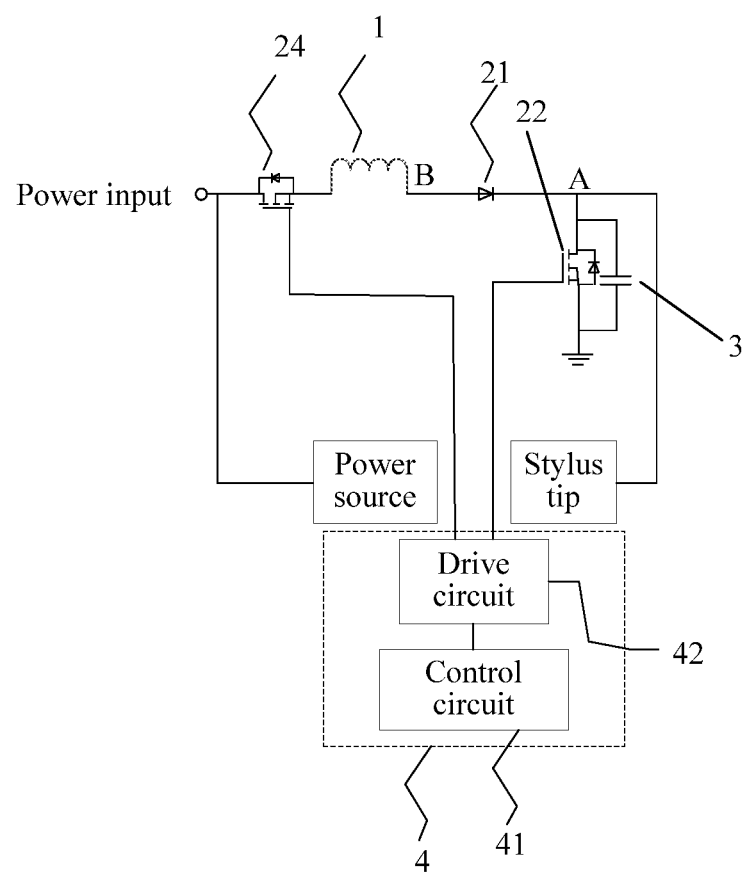
FIG. 7 is a schematic diagram of a boost circuit according to a fourth embodiment of the present disclosure.

In this embodiment, referring to FIG. 7, the switch module further includes a fourth switch 24. The fourth switch 24 is connected to the other terminal of the inductor 1, and the other terminal of the inductor 1 is connected to the power supply through the fourth switch 24.

Figure 11:
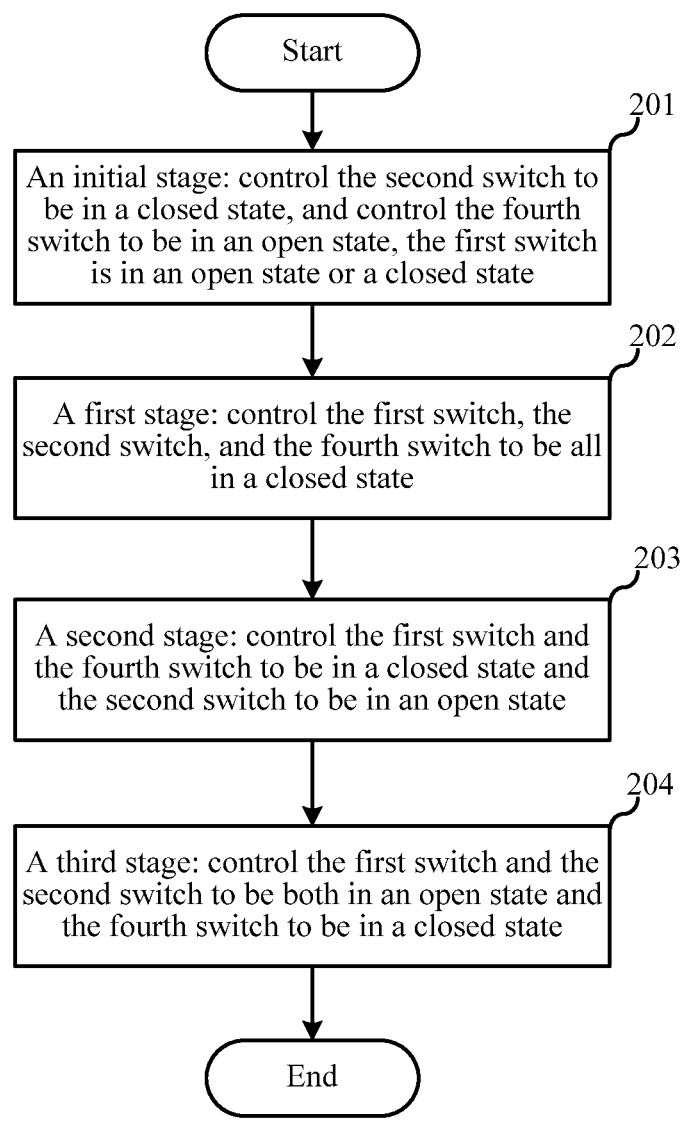
FIG. 11 is a flowchart of a control method for a boost circuit according to a seventh embodiment of the present disclosure.

FIG. 11 is a specific flowchart of the control method for the boost circuit.

Step 201: in an initial stage, the second switch is controlled to be in a closed state, and the fourth switch is controlled to be in an open state; the first switch is in an open state or a closed state.

Specifically, the control circuit 41 controls the drive circuit 42 to send a drive signal and controls the second switch 22 to be in a closed state and the fourth switch 24 to be in an open state. In this case, no energy is input to the circuit. The point A is grounded. The point B generates a negative voltage due to Lenz's law. The first switch 21 (diode) is in reverse cut-off and is in a turned-off state. The first terminal of the second switch 22 outputs a low-level voltage signal. It should be noted that, when the first switch 21 is a field-effect transistor, the first switch 21 may be in either an open state or a closed state. Preferably, the first switch 21 is in an open state, and circuit power consumption can be reduced.

Step 202: in a first stage, the first switch, the second switch and the fourth switch are controlled to be all in a closed state.

Specifically, the control circuit 41 controls the drive circuit 42 to send a drive signal and controls the second switch 22 and the fourth switch 24 to be both in a closed state. The power supply charges the inductor 1, and the point A is grounded. The voltage at the point B is greater than the voltage at the point A. The first switch 21 (diode) is in a turned-on state. The first terminal of the second switch 22 outputs a low-level voltage signal.

Step 203: in a second stage, the first switch and the fourth switch are controlled to be in a closed state and the second switch is controlled to be in an open state.

Specifically, the control circuit 41 controls the drive circuit 42 to send a drive signal and controls the fourth switch 24 to be in a closed state and the second switch 22 to be in an open state. The inductor 1 and the capacitor 3 form an LC resonance circuit when the second switch 22 is turned off. The voltage at the point B is in a rising state within a first quarter of the LC resonance period. The voltage at the point B is greater than the voltage at the point A. The first switch 21 (diode) is in a turned-on state. The voltage output by the first terminal of the second switch 22 rises as the voltage at the point B rises.

Step 204: in a third stage, the first switch and the second switch are controlled to be both in an open state and the fourth switch is controlled to be in a closed state.

Specifically, after the quarter of the LC resonance period, the control circuit 41 controls the drive circuit 42 to send a drive signal and controls the second switch 22 to be in an open state and the fourth switch 24 to be in a closed state. The voltage at the point B is in a falling state. The voltage at the point B is less than the voltage at the point A. The first switch 21 (diode) is in reverse cut-off and is in a turned-off state. In this case, the voltage signal output by the first terminal of the second switch 22 is clamped at a value of a voltage when the first switch 21 is open. That is, the first terminal of the second switch 22 outputs a voltage signal with a preset frequency and amplitude.

In this embodiment, the fourth switch 24 is further provided. When the fourth switch 24 is turned off, the power supply is disconnected from the inductor 1, and no energy is input to the circuit. When the fourth switch 24 is turned on, the power supply is connected to the inductor 1 to provide energy input to the circuit, so as to charge the inductor. With the fourth switch 24, by adjusting a charging time for the inductor, a maximum value of the charging current of the inductor 1 is controlled, and thus a maximum value of the rising voltage of the LC resonance circuit is controlled, thereby adjusting an amplitude of the high voltage output at the point A. That is, the amplitude of the high voltage output at the point A is adjusted by controlling the fourth switch 24.

Because the fourth embodiment and this embodiment correspond to each other, this embodiment may be implemented in conjunction with the fourth embodiment. The related technical details mentioned in the fourth embodiment are still effective in this embodiment. Technical effects that can be achieved in the fourth embodiment can also be obtained in this embodiment. To reduce repetition, the technical details are no longer described herein. Correspondingly, the related technical details mentioned in this embodiment are also applicable to the fourth embodiment.

In this embodiment, compared with the sixth embodiment, a frequency of an output high voltage is adjusted by a timing control of the second switch. With a timing control of the fourth switch, an amplitude of the output high voltage is adjusted.

Figure 6:
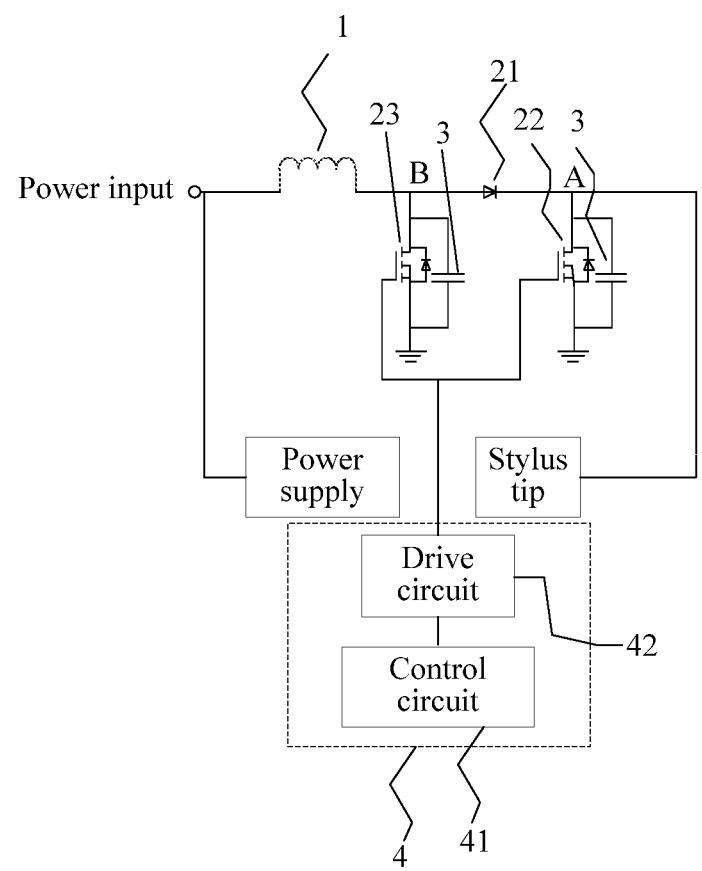
FIG. 6 is a schematic diagram of a boost circuit according to a third embodiment of the present disclosure.

An eighth embodiment of the present disclosure relates to a control method for a boost circuit, which is applied to the above boost circuit 10, referring to FIG. 6.

Figure 12:
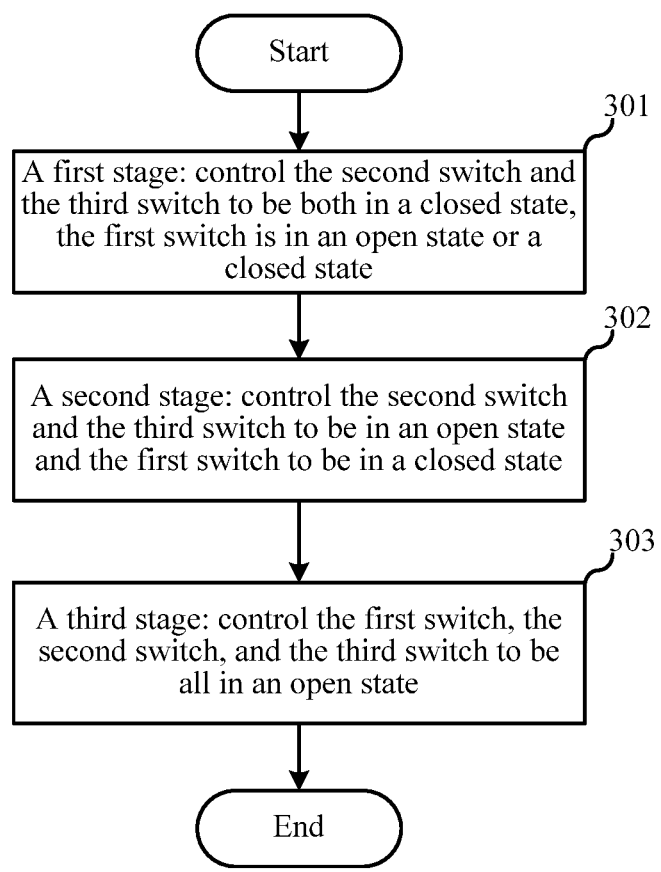
FIG. 12 is a flowchart of a control method for a boost circuit according to an eighth embodiment of the present disclosure.

FIG. 12 is a specific flowchart of the control method for the boost circuit.

Step 301: in a first stage, the second switch and the third switch are controlled to be both in a closed state, the first switch is in an open state or a closed state.

Specifically, the control circuit 41 controls the drive circuit 42 to send a drive signal and controls the second switch 22 and the third switch 23 to be both in a closed state. In this case, the point A and the point B are both grounded. The first switch 21 (diode) is turned off, and the first terminal of the second switch 22 outputs a low-level voltage signal. It should be noted that, when the first switch 21 is a field-effect transistor, the first switch 21 may be in either an open state or a closed state. Preferably, the first switch 21 is in an open state, and circuit power consumption can be reduced.

When the first switch 21 is a component having a control terminal, for example, a field-effect transistor, a control of the first switch 21 by the control circuit 41 is a direct control (that is, the control circuit 41 directly sends a signal representing switching on or off to the control terminal of the first switch 21). When the first switch 21 is a diode allowing an electric current to pass in a forward direction while a blocking current in a reverse direction, a switching state of the first switch 21 changes as switching states of the second switch 22 and the third switch 23 change. That is, the control circuit 41 controls switching on or off of the second switch 22 and the third switch 23, results in that the switching state of the first switch 21 (diode) changes accordingly. Therefore, when the first switch 21 is, for example, a component such as a diode (allowing an electric current to pass in a forward direction while a blocking current in a reverse direction), the control of the first switch 21 by the control circuit 41 may be understood as that the control circuit 41 controls the second switch 22 and the third switch 23 to indirectly control the first switch 21. That is, the control of the first switch 21 by the control circuit 41 is an indirect control.

Step 302: in a second stage, the second switch and the third switch are controlled to be in an open state and the first switch is controlled to be in a closed state.

Specifically, the control circuit 41 controls the drive circuit 42 to send a drive signal and controls the second switch 22 and the third switch 23 to be in an open state. The inductor 1 and the capacitor 3 form an LC resonance circuit when the second switch 22 and the third switch 23 are open. The voltage at the point B is greater than the voltage at the point A. In this case, the first switch 21 (diode) is in a turned-on state. Within a first quarter of the LC resonance period, the voltage signal output by the first terminal of the second switch 22 rises with resonance. That is, the voltage signal output by the first terminal of the second switch 22 rises as the voltage signal from the first terminal of the first switch 21 rises.

Step 303: in a third stage, the first switch, the second switch and the third switch are controlled to be all in an open state.

Specifically, after the quarter of the LC resonance period, the control circuit 41 controls the drive circuit 42 to send a drive signal and controls the second switch 22 and the third switch 23 to be both in an open state. In this case, the voltage at the point B is less than the voltage at the point A. The first switch 21 (diode) is in reverse cut-off and is in a turned-off state. A voltage of the first terminal of the first switch 21 (diode) is clamped. The voltage signal output by the first terminal of the second switch 22 is clamped at a value of a voltage when the first switch 21 is open. That is, the first terminal of the second switch 22 outputs a voltage signal with a preset frequency and amplitude.

For the boost circuit in this embodiment, without a magnetic saturation phenomenon in the inductor 1, a maximum value of a charging current of the inductor 1 depends on a conduction time of the second switch 22. The conduction time of the second switch 22 is duration from the first stage to the second stage. The maximum value of the rising voltage of the LC resonance circuit depends on the maximum value of the charging current of the inductor 1, and a final amplitude of a high voltage output at the point A depends on a time point when the first switch 21 is opened. When the second switch 22 is turned on, a low-level voltage signal is output at the point A. When the second switch 22 is open, a high voltage is output at the point A. The frequency of the high voltage output at the point A depends on a switching frequency of the second switch 22. Therefore, by controlling the switching timing of the first switch 21 and the second switch 22, simultaneous adjustments of both the amplitude and the frequency of the high voltage output at the point A are achieved, that is, a voltage signal with a preset frequency and amplitude can be output at the point A.

Because the third embodiment and this embodiment correspond to each other, this embodiment may be implemented in conjunction with the third embodiment. The related technical details mentioned in the third embodiment are still effective in this embodiment. Technical effects that can be achieved in the third embodiment can also be obtained in this embodiment. To reduce repetition, the technical details are no longer described herein. Correspondingly, the related technical details mentioned in this embodiment are also applicable to the third embodiment.

Compared with the existing technologies, in this embodiment, a control method in which the third switch is included is provided, so that circuit power consumption is reduced and system efficiency is improved.

A ninth embodiment of the present disclosure relates to a control method for a boost circuit. This embodiment is an improvement based on the eighth embodiment. A major improvement lies in that: the control method further includes a control of the fourth switch when a fourth switch is included in the switch module.

In this embodiment, referring to FIG. 8, the switch module further includes a fourth switch 24. The fourth switch 24 is connected to the other terminal of the inductor 1. The inductor 1 receives a power supply voltage through the fourth switch 24.

Figure 13:
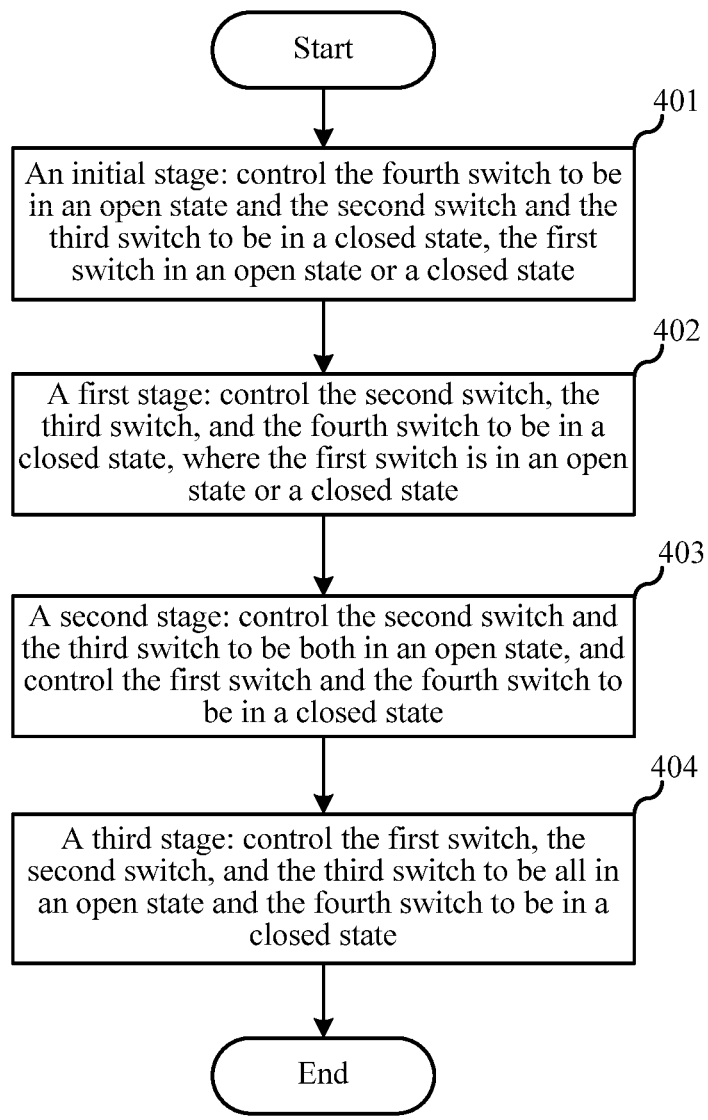
FIG. 13 is a flowchart of a control method for a boost circuit according to a ninth embodiment of the present disclosure.

FIG. 13 is a specific flowchart of the control method for a boost circuit.

Step 401: in an initial stage, the fourth switch is controlled to be in an open state and the second switch and the third switch are controlled to be in a closed state, the first switch 21 is in an open state or a closed state.

Specifically, the control circuit 41 controls the drive circuit 42 to send a drive signal, and controls the fourth switch 24 to be in an open state, and the second switch 22 and the third switch 23 to be both in a closed state. In this case, no energy is input to the circuit. The point A and the point B are both grounded, the first switch 21 (diode) is in a turned-off state, and the first terminal of the second switch 22 outputs a low-level voltage signal. It should be noted that, when the first switch 21 is a field-effect transistor, the first switch 21 may be in either an open state or a closed state. Preferably, the first switch 21 is in an open state, and circuit power consumption can be reduced.

Step 402: in a first stage, the second switch, the third switch and the fourth switch are controlled to be all in a closed state, the first switch is in an open state or a closed state.

Specifically, the control circuit 41 controls the drive circuit 42 to send a drive signal and controls the second switch 22, the third switch 23 and the fourth switch 24 to be all in a closed state. The power supply charges the inductor 1. The point A and the point B are both grounded. The first switch 21 (diode) is in a turned-off state. In this case, the first terminal of the second switch 22 outputs a low-level voltage signal. It should be noted that, when the first switch 21 is a field-effect transistor, the first switch 21 may be in either an open state or a closed state. Preferably, the first switch 21 is in an open state, and circuit power consumption can be reduced.

Step 403: in a second stage, the second switch and the third switch are controlled to be both in an open state, the first switch and the fourth switch are controlled to be in a closed state.

Specifically, the control circuit 41 controls the drive circuit 42 to send a drive signal, controls the second switch 22 and the third switch 23 to be both in an open state, and controls the fourth switch 24 to be in a closed state. The inductor 1 and the capacitor 3 form an LC resonance circuit when the second switch 22 and the third switch 23 are open. The voltage at the point B is in a rising state within a first quarter of the LC resonance period. The voltage at the point B is greater than the voltage at the point A. The first switch 21 (diode) is in a turned-on state. In this case, the voltage signal output by the first terminal of the second switch 22 rises with resonance. That is, the voltage signal output by the first terminal of the second switch 22 rises as the voltage signal of the first terminal of the first switch 21 rises.

Step 404: in a third stage, the first switch, the second switch and the third switch are controlled to be all in an open state, and the fourth switch is controlled to be in a closed state.

Specifically, after the quarter of the LC resonance period, the control circuit 41 controls the drive circuit 42 to send a drive signal, and controls the second switch 22 and the third switch 23 to be both in an open state and the fourth switch 24 to be in a closed state. In this case, the voltage at the point B is in a falling state. The voltage at the point B is less than the voltage at the point A. The first switch 21 (diode) is in reverse cut-off and is in a turned-off state. The voltage of the first terminal of the first switch 21 (diode) is clamped. The voltage signal output by the first terminal of the second switch 22 is clamped at a value of a voltage when the first switch 21 is open. That is, the first terminal of the second switch 22 outputs a voltage signal with a preset frequency and amplitude.

In this embodiment, when the fourth switch 24 is turned off, the power supply is disconnected from the inductor 1. No energy is input to the circuit. When the fourth switch 24 is turned on, the power supply and the inductor 1 are connected to form a circuit to provide an energy input, so as to charge the inductor. With the fourth switch 24, by adjusting a charging time for the inductor, a maximum value of the charging current of the inductor 1 is controlled, and thus a maximum value of the rising voltage of the LC resonance circuit is controlled, thereby adjusting an amplitude of the high voltage output at the point A. That is, the amplitude of the high voltage output at the point A is adjusted by controlling the fourth switch 24.

Because the fourth embodiment and this embodiment correspond to each other, this embodiment may be implemented in conjunction with the fourth embodiment. The related technical details mentioned in the fourth embodiment are still effective in this embodiment. Technical effects that can be achieved in the fourth embodiment can also be obtained in this embodiment. To reduce repetition, the technical details are no longer described herein. Correspondingly, the related technical details mentioned in this embodiment are also applicable to the fourth embodiment.

In this embodiment, compared with the eighth embodiment, a frequency of an output high voltage is adjusted by a timing control of the second switch. With a timing control of the fourth switch, an amplitude of the output high voltage is adjusted.

The division of steps in the various methods above is merely for clear description. During implementation, the steps may be combined into one step or some steps may be divided into multiple steps, which all fall within the protection scope of this patent provided that a same logic relationship is included. The addition of insignificant changes or introduction of insignificant designs to the algorithms or procedures without changing the core designs of the algorithms and procedures of the patent all fall within the protection scope of the patent.

A person of ordinary skill in the art may understand that the above embodiments are specific embodiments for implementing the present disclosure. In actual applications, various changes may be made to the embodiments in forms and details without departing from the spirit and scope of the present application.

What is claimed is:

1. A boost circuit, comprising: an inductor, a switch module, a capacitor and a control module;
    the switch module comprising at least a first switch and a second switch, the capacitor and the second switch are connected in parallel;
    a first terminal of the first switch is connected to one terminal of the inductor, a second terminal of the first switch is connected to a first terminal of the second switch, and a second terminal of the second switch is grounded; and an other terminal of the inductor is configured to connect a power supply; and
    the control module is connected to a control terminal of the switch module; and the control module is configured to control states of the switches in the switch module, to enable the first terminal of the second switch to output a voltage signal with a preset frequency and amplitude.

2. The boost circuit according to claim 1, wherein the switch module further comprises a third switch; and
    a first terminal of the third switch is connected to the first terminal of the first switch, and a second terminal of the third switch is grounded.

3. The boost circuit according to claim 1, wherein the switch module further comprises a fourth switch, and the other terminal of the inductor is connected to the power supply through the fourth switch.

4. The boost circuit according to any one of claim 1, wherein the switches in the switch module are field-effect transistors; and
    the control module is connected to a control terminal of each field-effect transistor, to control each field-effect transistor.

5. The boost circuit according to of claim 1, wherein the first switch in the switch module comprises a diode, and the other switch/switches in the switch module comprise a field-effect transistor(s); and
    the control module is connected to a control terminal of each field-effect transistor, to control each field-effect transistor.

6. The boost circuit according to of claim 1, wherein the control module comprises a drive circuit configured to drive the switch module and a control circuit configured to control a driving manner of the drive circuit.

7. The boost circuit according to claim 6, wherein the drive circuit and the control circuit are integrated in one chip.

8. An active stylus, comprising: a stylus body, a stylus tip, a power supply, and a boost circuit;
the stylus tip is disposed at an end of the stylus body;
the power supply and the boost circuit are both disposed inside the stylus body; and
the boost circuit comprising: an inductor, a switch module, a capacitor and a control module;
the switch module comprises at least a first switch and a second switch, the capacitor and the second switch are connected in parallel;
a first terminal of the first switch is connected to one terminal of the inductor, a second terminal of the first switch is connected to a first terminal of the second switch, and a second terminal of the second switch is grounded; and an other terminal of the inductor is configured to connect a power supply;
the other terminal of the inductor is connected to the power supply, and a first terminal of the second switch is connected to the stylus tip; and
the control module is connected to a control terminal of the switch module; and the control module is configured to control states of the switches in the switch module, to enable the first terminal of the second switch to output a voltage signal with a preset frequency and amplitude.

9. The active stylus according to claim 8, wherein the switch module further comprises a third switch; and
a first terminal of the third switch is connected to the first terminal of the first switch, and a second terminal of the third switch is grounded.

10. The active stylus according to claim 8, wherein the switch module further comprises a fourth switch, and the other terminal of the inductor is connected to the power supply through the fourth switch.

11. The active stylus according to claim 8, wherein the switches in the switch module are field-effect transistors; and
the control module is connected to a control terminal of each field-effect transistor, to control each field-effect transistor.

12. The active stylus according to claim 8, wherein the first switch in the switch module comprise a diode, and the other switch/switches in the switch module comprise a field-effect transistor(s); and
the control module is connected to a control terminal of each field-effect transistor, to control each field-effect transistor.

13. The active stylus according to claim 8, wherein the control module comprises a drive circuit configured to drive the switch module and a control circuit configured to control a driving manner of the drive circuit.

14. The active stylus according to claim 8, wherein the drive circuit and the control circuit are integrated in one chip.

15. A control method for a boost circuit, wherein the boost circuit comprises an inductor, a switch module, a capacitor and a control module; the switch module comprises at least a first switch and a second switch, the capacitor and the second switch are connected in parallel; a first terminal of the first switch is connected to one terminal of the inductor, a second terminal of the first switch is connected to a first terminal of the second switch, and a second terminal of the second switch is grounded; an other terminal of the inductor is configured to connect a power supply; and the control method comprises:
a first stage: controlling the first switch and the second switch to be both in a closed state, to enable the first terminal of the second switch to output a low-level voltage signal;
a second stage: controlling the first switch to be in a closed state and the second switch to be in an open state, to enable the inductor and the capacitor to generate LC resonance, and the voltage signal output by the first terminal of the second switch to change as a voltage signal from the first terminal of the first switch changes; and
a third stage: controlling the first switch and the second switch to be both in an open state, to enable the voltage signal from the first terminal of the first switch to be clamped, and the first terminal of the second switch to output a voltage signal with a preset frequency and amplitude, wherein
the first stage, the second stage, and the third stage are sequentially performed.

16. The control method according to claim 15, wherein the switch module further comprises a fourth switch, and the fourth switch is connected to the other terminal of the inductor; the other terminal of the inductor is connected to the power supply through the fourth switch; and before the first stage, the control method further comprises:
an initial stage: controlling the second switch to be in a closed state, and controlling the fourth switch to be in an open state, to enable the first terminal of the second switch to output a low-level voltage signal, wherein the first switch is in an open state or a closed state;
further controlling the fourth switch to be in a closed state in the first stage;
further controlling the fourth switch to be in a closed state in the second stage; and
further controlling the fourth switch to be in a closed state in the third stage.

17. The control method according to claim 15, wherein the boost circuit further comprises a third switch, a first terminal of the third switch is connected to the first terminal of the first switch, and a second terminal of the third switch is grounded; and the control method comprises:
a first stage: controlling the first switch, the second switch and the third switch to be in a closed state, to enable the first terminal of the second switch to output a low-level voltage signal;
a second stage: controlling the second switch and the third switch to be both in an open state, and controlling the first switch to be in a closed state, to enable the inductor and the capacitor to generate LC resonance and the capacitor, and the voltage signal output by the first terminal of the second switch to change as a voltage signal from the first terminal of the first switch changes; and
a third stage: controlling the first switch, the second switch and the third switch to be all in an open state, to enable a voltage from the first terminal of the first switch to be clamped, and the first terminal of the second switch to output a voltage signal with a preset frequency and amplitude, wherein
the first stage, the second stage, and the third stage are sequentially performed.

18. The control method according to claim 17, wherein the switch module further comprises a fourth switch, and the fourth switch is connected to the other terminal of the inductor; the other terminal of the inductor is connected to a power supply voltage through the fourth switch; and before the first stage, the control method further comprises:

an initial stage: controlling the fourth switch to be in an open state, and controlling the second switch and the third switch to be in a closed state, to enable the first terminal of the second switch to output a low-level voltage signal, wherein the first switch is in an open state or a closed state;

further controlling the fourth switch to be in a closed state in the first stage;

further controlling the fourth switch to be in a closed state in the second stage; and further controlling the fourth switch to be in a closed state in the third stage.

* * * * *